(12) United States Patent
Menzl

(10) Patent No.: US 7,058,133 B2
(45) Date of Patent: Jun. 6, 2006

(54) PROCESS FOR DIGITAL COMMUNICATION AND SYSTEM COMMUNICATING DIGITALLY

(75) Inventor: Stefan Daniel Menzl, Jona (CH)

(73) Assignee: Phonak AG, Stafa (CH)

( * ) Notice: Subject to any disclaimer, the term of this patent is extended or adjusted under 35 U.S.C. 154(b) by 631 days.

(21) Appl. No.: 09/903,453

(22) Filed: Jul. 11, 2001

(65) Prior Publication Data

US 2002/0054684 A1     May 9, 2002

Related U.S. Application Data

(63) Continuation of application No. PCT/CH99/00009, filed on Jan. 11, 1999.

(51) Int. Cl.
*H04L 27/00* (2006.01)
(52) U.S. Cl. ............... 375/259; 375/219; 375/356; 381/313; 381/314; 381/316; 381/58
(58) Field of Classification Search ............... 375/259, 375/219, 256; 381/58, 23, 316, 313, 314; 710/57; 709/230
See application file for complete search history.

(56) References Cited

U.S. PATENT DOCUMENTS 5,210,803 A     5/1993  Martin et al.
5,226,086 A  *  7/1993  Platt .................... 381/58

(Continued)

FOREIGN PATENT DOCUMENTS

DE      197 02 143 A1     7/1998
EP      0 341 995          11/1989

OTHER PUBLICATIONS

Mosch et al.; A 660-uW 50 Mops 1-V DSP for a Hearing Aid Chip Set; 2000 IEEE; Nov, vol. 36.*

(Continued)

*Primary Examiner*—Stephen Chin
*Assistant Examiner*—Eva Zheng
(74) *Attorney, Agent, or Firm*—Pearne & Gordon LLP

(57) ABSTRACT

According to the present invention, a three-line bus is used for communication between a first digital unit (1) and two other digital units (3). The three-line bus includes a system clock line (SCL) as well as a data transmission line (SD) through which data is sent from the two other units (3), i.e. transmitting units, to the first unit (1), i.e. receiving unit. The system uses an authorization line (WS) for determining which of the two transmitting units (3) is capable of writing data on the data transmission line (SD) and when it can do so. The communication from the first unit (1), now operating as a transmitter, to the two other units (3), now operating as receivers, is made possible by the fact that data signals are also injected in the authorization line (WS) and transmitted through the line together with the authorization control signals.

34 Claims, 5 Drawing Sheets

U.S. PATENT DOCUMENTS 5,604,812 A    2/1997  Meyer
5,758,073 A *  5/1998  Liang et al. ................ 709/230
6,052,748 A *  4/2000  Suominen et al. ............ 710/57

OTHER PUBLICATIONS

Mitchell R L: "I2C Transmission Techniques" Wescon Technical Papers; vol. 30; Nov. 18, 1986; XP000810862; pp. 21/2-01-21/2-09.

Button, M: "Busman's Guide to I2C" Electronics World and Wireless World; vol. 100; No. 1694; Jan. 1, 1994; pp. 24-28; XP000424163.

Mitchell R.L: "I2C Transmission Techniques" Wescon Technical Papers; vol. 30; Nov. 18, 1986; XP000810862; pp. 21/2-01-21/2-09.

Button, M: "Busman's Guide to I2C" Electronics World and Wireless World; vol. 100; No. 1694; Jan. 1, 1994; pp. 24-28; XP000424163.

Mosch, P. et al.: "A 600 µW 50-MOPS 1-V DSP for a Hearing Aid Chip Set" IEEE Journal of Solid-State Circuits; vol. 35; No. 11; Nov. 2000.

* cited by examiner

PROCESS FOR DIGITAL COMMUNICATION AND SYSTEM COMMUNICATING DIGITALLY

This invention concerns a process for digital communication according to the wording in the preamble to Claim 1 and Claim 2, and a system communicating digitally according to Claims 18 and 19.

This invention proceeds from problems as they arise in hearing aid technology. On the other hand, its proposals for solving them can be generalized, in the sense that they can basically be used for digital communication between units.

Hearing aid technology is increasingly moving toward processing signals digitally, especially audio signals, for which a so-called "digital signal processing" unit or DSP is used. Depending on the hearing aid configuration, these DSP are connected to many different, varied and potentially identical peripheral units, thus, for example, one or more acoustic/electric converters, T-coils and controllers, such as potentiometers for adjusting amplification, interface units, etc. In the most general cases, such units are analog units in themselves. But so they can be connected flexibly to the DSP, A/D converters are integrated into such analog peripheral units, as they are used on hearing aids, so that the following will assume that the peripheral units each have outputs for serial digital data. Please refer also to application PCT/CH98/00502 by the same applicant on this, which is enclosed with this application as APPENDIX A and which describes developments in the field of digital hearing aid configuration today. This APPENDIX A should be an integral part of the application in this sense.

It proposes, inter alia, establishing communication between peripheral units and a central digital processing unit, the DSP, by a three-wire connection system, like for example an $I^2S$ bus and corresponding interface units, like the ones sold by Philips.

Such a bus configuration has proven extremely worthwhile, inter alia, because of its simplicity, in terms of the hardware and software to be installed, and its energy consumption for hearing aid applications.

This invention is thus based on such a three-wire bus configuration, in which serial digital data SD are transmitted on a data line SD, permission signals WS on a second line and clock signals SCL on a third line. A system working with such a three-line bus, as it is used in the above-mentioned application especially for hearing aids, will be explained using FIG. 1 as the basis for understanding the invention on which this application is based.

Between a digital signal-processing unit DSP and two peripheral units 3, there is, apart from electrical feed lines, a three-wire bus connection 5. On the one line SCL, the system clock signal is placed, which is usually generated in the DSP (not shown). On a second line SD, the data-transmission line, or data line for short, serial digital data from both peripheral units 3 are written and transmitted to the DSP, for which the first units have data outputs ASD to output such data, and the DSP has a data input ESD.

Usually, a permission signal is placed on the third line WS, the so-called "word-select line" by the DSP, and its respective binary state determines when which of the two peripheral units 3 can write data for the DSP on the common data line SD.

Particularly on hearing aids with a bus system, according to FIG. 1, there is a need, while keeping the advantages of the three-wire bus system, to create two-way data communication between the DSP and the peripheral units 3, not just one-way communication from the peripheral units 3 to the DSP, as in FIG. 1.

There is another problem with the system in FIG. 1. Namely, if the hardware is configured, the DSP does not know how many peripheral units—one or two—are connected, and the one peripheral unit considered 3 "knows" just as little about whether it is connected to the bus alone, or whether a second such unit is connected to the same bus 5: without contact, there is a conflict over writing data to the SD; each unit provided considers itself entitled to write data, for example in the '1' state of the WS line.

SUMMARY OF THE INVENTION

Thus, this invention starts from a process for digital communication between:
  a first unit—the DSP—which has one input ESD for serial digital data,
  at least two second units—3—each of which can be connected to a data output for serial, digital data, whereby the input ESD of the first unit DSP is connected via a common data line SD to the outputs ASD of the two units connected and, in this process, serial digital data are supplied from the second unit to the first over the data line SD mentioned, controlled by a binary permission signal supplied to the second units 3 together via a permission line WS, and a clock signal supplied to all units connected via a clock line SCL.

Starting from such a process or such a digitally communicating system, this application sets itself the following task:
  to make data communication also possible between the first unit—DSP—and the peripheral unit or units—3—connected to it;
  in an initialization phase, to identify the prevailing system constellation in order to intervene, control and prevent conflicts on the SD line, depending on the results.

It should be emphasized that although the procedure in the invention is based on the fact that two peripheral units can be connected to a DSP unit via the three-wire bus system mentioned, the invention can be expanded by connecting more than two peripheral units to the one DSP, as can be seen from the following description.

The process solves the problem mentioned by having the first unit communicate with the second and by having data signals superimposed on the binary permission signal on the first unit, and received and evaluated on the second units connected.

The second problem mentioned is solved by the fact that—in an initialization phase—independent, serial digital random signals are applied to the data line on the second unit or units connected to it, and it is observed whether a given signal state occurs on that line which clearly indicates the number of second units connected.

Although in certain cases, the solution to the first or second problem mentioned above may meet the respective need alone, in another much preferred embodiment of the invention, whether it is the process or the digitally communicating system, a combination of the solutions mentioned in the invention to the two problems is proposed.

As was mentioned, the problems on which this invention is based and their solution come from hearing aid development, considering the miniaturization and energy problems that exist with hearing aids.

Therefore, in another preferred embodiment, the first unit is a digital signal-processing unit of a hearing aid, and the second units are peripheral units of the hearing aid, like especially acoustic/electric converters, electric actuators, or for example T coils, controls, like potentiometers or switches, interface units, etc.

In another preferred embodiment of the invention, the peripheral units work like acoustic/electric converters, for example and typically, over a preferably built-in A/D converter on the data line.

In another preferred embodiment of the invention, the random signal is produced by the fact that the A/D converter working on the data output is given a noise signal on the input side, but preferably directly uses the quantization noises of an LSB (lowest significant bit) on the A/D converter output.

In terms of the solution to the conflict of which second unit can write when on the data line, in one much preferred embodiment, the procedure is that only one of the second units provided can detect the predetermined signal state mentioned at the same time.

So when that state is detected on only one of the two units connected, then that it "knows" that, for example, a second unit is also connected. The permission phase determined by the permission signal on the permission line WS for the second unit considered is now inverted, preferably on the second unit detecting that state first.

At the beginning, the initialization WS='1' is the permission phase, so WS='0' is defined as the permission phase on the second unit identifying. Thus, the second unit identifying acts "different" than or complementary to the second unit connected in terms of permission to write data: This resolves the conflict over writing data on the same data line SD.

In one preferred embodiment, the signal is detected on the data line at each second unit and is logically coupled to the random signal given at this unit prevailing at the same time. The random signals of the second unit connected are also preferably placed on the data line via a "wired AND" interconnection—according to Claim 10—and the presence of two second units is indicated when the state of the data line is '0', but the state of the random signal assigned to it is '1.'

Because the first unit does not usually tolerate signals on the data-transmission line that are not defined electrically for an open input, it can be essential that a second unit considered connected also definitively know that there is no second one. This is achieved, by the fact that every second unit connected considers itself alone on the second unit connected to the data line after a given span of time has gone by without it having detected the predetermined signal mentioned itself and without a random signal appearing on the data line in phases of the permission signal write-locked for it.

In one preferred embodiment on the second unit, which has identified itself as the only one connected to the data line, in phases write-locked for it, a defined electrical potential is now applied to the data line, preferably a potential corresponding to the logic state '0.'

This makes it so that in the initialization phase, how many second units, one or two, are connected to the common data line is identified without the cooperation of the first unit. It also makes it so that if there are two units provided, the data-write competency is controlled and if there is only one second unit, electrical conditions are produced on the data line that, in any case, meet the requirements for the first unit.

Thus, the initialization phase mentioned preferably begins by turning on the electric power to the units mentioned and ends a certain number of SCL cycles later.

If more than two second units are connected to a single first unit, then it remains so for all units provided, when a common SCL clock line and a common permission line WS are used, while an additional data line is provided per other pair and/or per other initiated pair of the second unit provided. This keeps it so that only two second units can write to a common data line, on one hand, and the advantages of the three-wire bus connection are also used, on the other.

Regarding the identification and conflict resolution described above, if more than two second units are connected to the first unit, the configuration identification and conflict resolution are logically resolved per data line provided according to the invention.

Thus, after a given time span has expired in the initialization phase, the respective number of second units connected is known on all data lines provided, and permission to write data is given without conflict.

Particularly when more than two second units are connected to one first unit and, as mentioned, only one common permission line is working on all second units provided, it is necessary, if the first unit, and the first aspect of this invention, should communicate with the second units over the permission line, that the second units connected can be addressed as receiver stations.

For this purpose, addresses are produced on at least some of the second units connected by means of random digital signals, and preferably, after the prescribed initialization phase, by means of those random signals that were used in the initialization phase for the identification process.

The random addresses of every second unit are read on the first unit and compared with one another. According to the invention, the first unit orders all second units, via the permission line, to generate new random addresses when at least two of the addresses compared are the same.

Then, data signals from the first unit, and especially command data, are produced only within predetermined sections of phases of the permission signal, which ensures that no conflicts arise between the permission signals given on the permission line and the data signals mentioned.

DETAILED DESCRIPTION OF THE PREFERRED EMBODIMENTS

Figure 1:
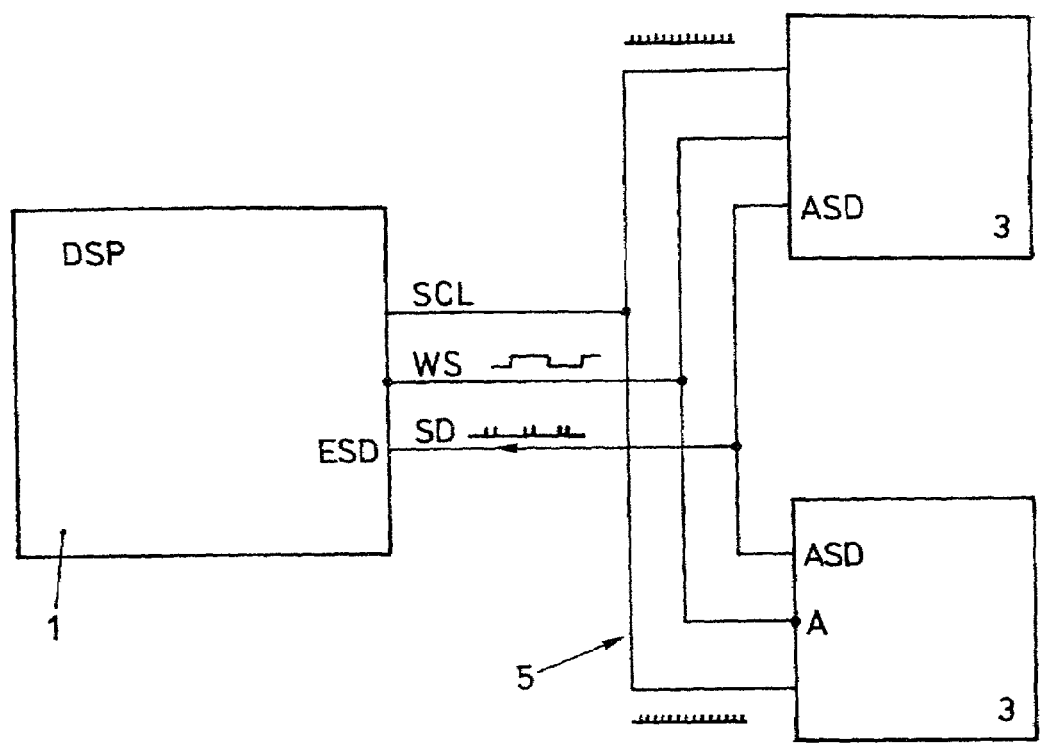
FIG. 1 shows a prior art system using a three-line bus.
Figure 2:
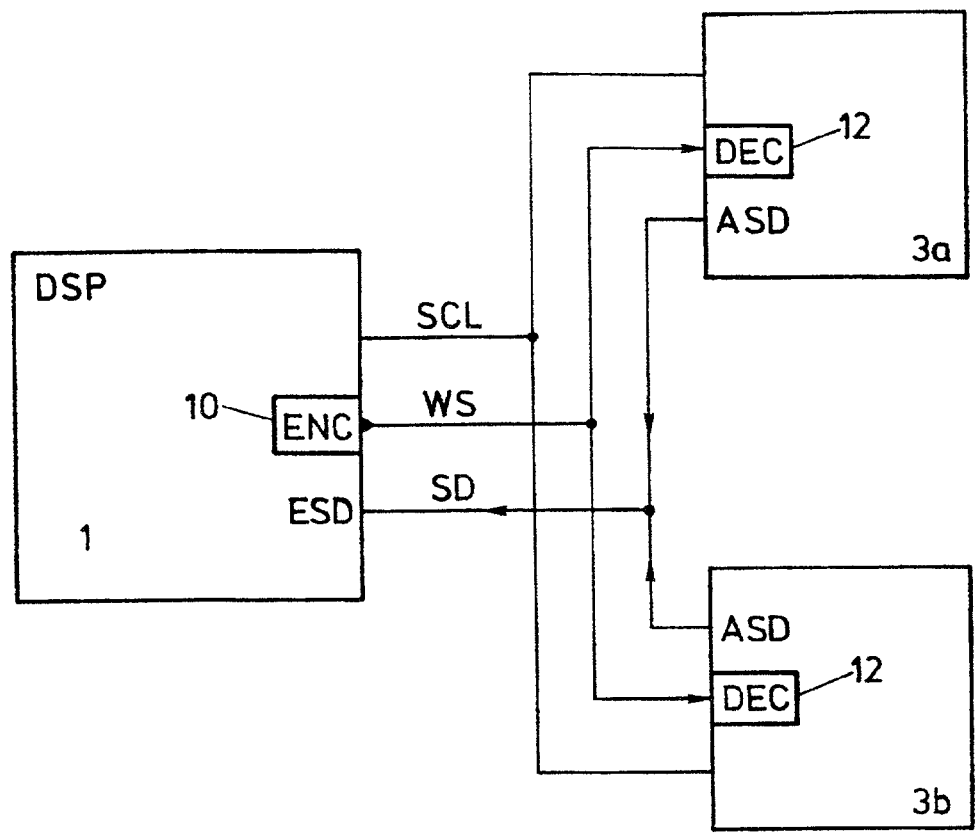
FIG. 2 shows the system in the invention, which is capable of two-way communication, starting with the view in FIG. 1

FIG. 2 is a schematic view of the system in the invention, which works by the process in the invention. The same reference numbers are used as in FIG. 1. Unlike the procedure in FIG. 1, DSP1, which is connected to an output for the permission line WS, has a coder 10 and peripheral units 3a, 3b with a working connection to the input for the permission line WS, here a decoder 12.

Figure 3:
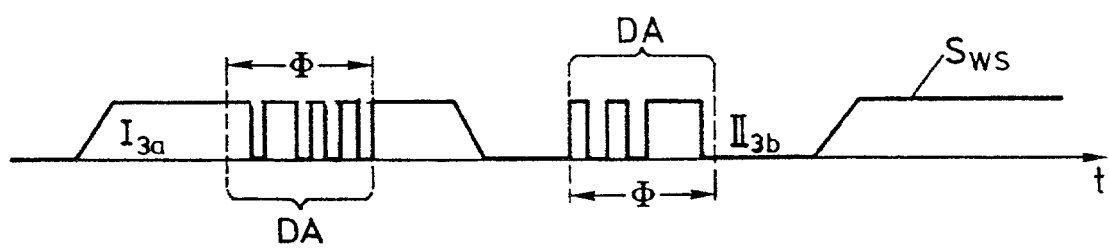
FIG. 3 shows schematically the signal in the invention produced by superimposing the permission signal and data signal on the permission line on a time axis.

FIG. 3 shows, on the time axis, the usual cyclic binary permission signal $S_{WS}$, which is put on the permission line WS, as known and according to the known system in FIG. 1. In the one phase, corresponding to $I_{3a}$, one of the peripheral units, for example 3a, is authorized to write data on data line SD, and in the complementary phase, $II_{3b}$, the second peripheral unit connected, for example 3b, is. According to the invention, now within predetermined sections of the phase φ of the permission signal $S_{WS}$ by the coder 10 of DSP1, and as shown schematically in FIG. 3, data DA, especially command data, are transmitted to the peripheral units 3a, 3b and decoded there in the respective decoder 12. To address one or if necessary—as will still be explained—more of the peripheral units by DSP1 purposefully or selectively, the data DA superimposed on the $S_{WS}$ signals, if necessary, include call-up addresses for the corresponding peripheral units 3.

This makes it possible for two-way communication to be established between the peripheral units and the DSP1 over the three-wire bus connection, on one hand from the peripheral units to DSP1 over data line SD, and on the other hand, from DSP1 to the peripheral units 3 over the permission line WS.

Now, if the system hardware is configured according to FIG. 1 or—and preferably—according to FIG. 2, one or two peripheral units 3 can be provided. If the same permission signals $S_{WS}$ are first fed to the peripheral units 3 connected over the same permission line WS, and both units consider themselves entitled to write to data line SD first, for example in Phase I, as in FIG. 3, a conflict arises in terms of permission to write to line SD.

Figure 4:
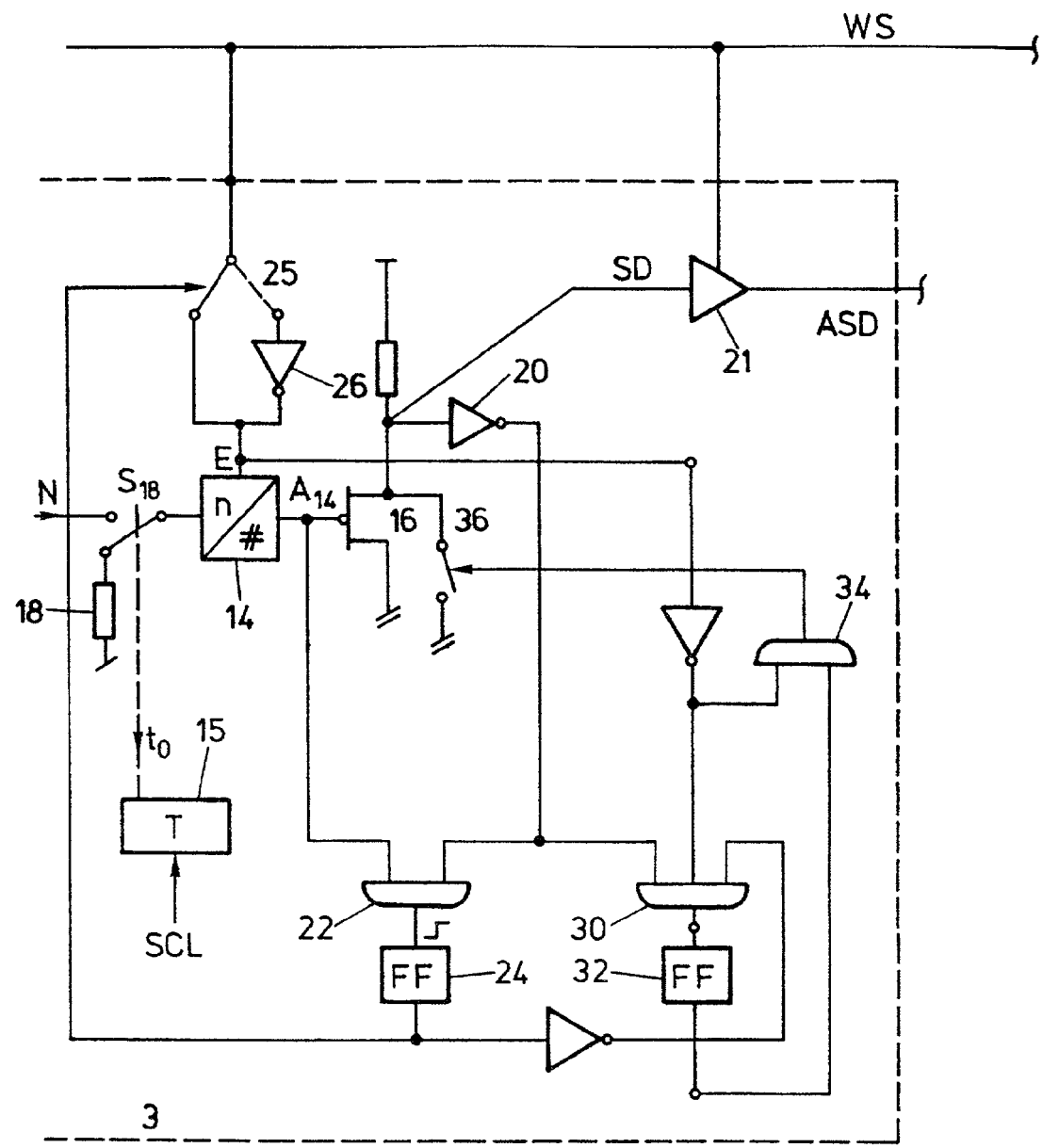
FIG. 4 shows one preferred embodiment of the output phase of the second unit in the invention, which works according to the invention, as preferably also used on the system in FIGS. 2 and 3, in the form of a simplified signal flow/function chart.

FIG. 4 is a schematic view of one preferred design of the output stages provided in the second aspect of the invention on the system in FIG. 1 and, preferably in FIG. 2, on the peripheral units 3. All peripheral units provided preferably in this aspect of the invention are built the same as far as the output stage shown in FIG. 4 is concerned. This is especially true of peripheral units on a hearing aid built with the system described. One or two peripheral units 3, bordered by dotted lines in FIG. 4, are connected to data line SD.

An A/D converter 14 works with its output $A_{14}$ on a MOSFET output 16, via which the output signals $A_{14}$ of the A/D converter of two units are placed on data line SD in a "wired AND" circuit.

In the initialization phase, i.e., the phase in which the prevailing hardware configuration of the system is identified and data-write conflicts are resolved, the input of the A/D converter 14 is connected by the effective signal path N to a noise source, like a resistor 18, for example, as is shown schematically by switch $S_{18}$, for example. The flipping of switch $S_{18}$ into the "random position" is preferably triggered by first applying the supply voltage to the system (not shown). At the same time, a timer 15 is triggered. With the A/D converter 14, a random generator is produced on the peripheral units connected, hence random generators independent of one another. First of all, the peripheral units connected 3 write in the permission phase, for example I in FIG. 3, the digital random signals so generated at the same time on the data line SD. In another much preferred form of embodiment, one or more pair of LSBs of the converter 14 are used as the random signals. Usually, the A/D converter produces a noise signal on its LSB. In this case, the resistor 18 working as an externally connected noise source is not necessary, and only the LSBs mentioned at output A14 are used.

The electrical signal prevailing at that moment on data line SD is picked up on each of the peripheral units 3 connected by an inverter 20 and is fed to an AND interconnection 22 with the prevailing output signal $A_{14}$ of the A/D converter 14.

When the output signal of the A/D converter 14 is '1' and the prevailing electric potential on the SD lines is '0', this clearly means that a second peripheral unit is working on the data line SD, and with an output signal of it's a/D converter, which is on '0' at the moment. This state, clearly indicating the presence of two peripheral units on the same data line SD, is recorded at interconnection 22 and stored, as shown schematically with the bistable element 24.

Because of the random signal placed on the data line SD, after a given period of time, this clear configuration-display signal stored on bistable element 24 will appear, with a probability dependent on the length of time selected, if two peripheral units are connected to line SD. The interconnection 22 makes sure that only one of the two peripheral units connected 3 can detect the state mentioned at the same time, so that one of these units will always be the first to detect that state.

With the setting of the bistable element 24, i.e., to identify that two peripheral units are working on data line SD, the permission signal of line WS acting on the enable input E of the A/D converter 14, for example, is inverted on the identifying peripheral unit, as shown schematically with the switch 25 and the inverter 26.

Now, permission to write for the identifying peripheral unit 3 is inverted in terms of the state formerly prevailing, hence switched to Phase II in FIG. 3, for example.

On the two identifying units 3 provided, the first unit identifying this has changed permission phases, while the second unit provided continues to write data in the permission phase previously prevailing, for example I in FIG. 3 on line SD. In any case, the peripheral unit 3 that does not identify that two such units are connected and whose bistable element 24 is not therefore on, has no information on whether a second unit is provided or whether it is the only one connected.

In many cases, however, it is essential—as explained below—that when only one peripheral unit is connected, it is identified directly and without doubt. Although the unit that has detected the presence of a second unit "knows" that two units are working on data line SD, on the other hand, a peripheral unit in which this state was not detected, does not know whether, if necessary, a second unit has already detected this state and has reacted accordingly or whether it is actually the only one connected.

If one peripheral unit on the system in FIG. 1 or FIG. 2 is the only one connected to data line SD, and writes data at the rate of permission signal $S_{WS}$ on permission line WS, the electrical potential of data line SD is not defined in phases when writing is not allowed. This is because, as shown with element 21 in FIG. 4, output ASD is connected "floating" by signal WS in non-write-permissible phases. This electrical state of data line SD is generally not allowed at the input ESD of DSP1, and usually cannot be considered, because the systems previously known are designed to work defined with two peripheral units 3.

One peripheral unit 3 considered is then connected to data line SD as the only one, if, on the one hand, the bistable element 24, is not set on it, i.e., this unit has not detected the presence of a second peripheral unit and in write-locked phases of the permission signal, no random digital signal is placed on the permission line WS on data line SD.

By logically interconnecting the inverted output signal of bistable element 24, the inverted permission signal on enabling input E of the A/D converter 14 and the inverted signal on data line SD, according to FIG. 4, as on the logic AND interconnection 30, on the output side of this interconnection, a '1' signal is then produced if no second unit was detected on the unit considered (element 24 not set), and the permission signal is in a phase that does not permit this unit, and during this permission phase no random signal is produced on the data line SD.

If this state is detected, another bistable element 32 is set, whose output is interconnected to the inverted permission signal $S_{WS}$ at a logic AND interconnection 34. As schematically with switching element 36, data line SD is switched to a defined, for example, reference potential in the write-locked phases of the unit 3 being considered if that unit is working alone on the data line.

This corresponds to placing '0' signals on data line SD.

Now, in the initialization phase described, without DSP1 doing anything, both is any write conflict on data line SD ruled out, and it is made sure that if a single peripheral unit is connected, even in write-locked phases, a defined electrical potential will prevail on data line SD.

As can be seen, communication with DSP1 is not necessary for the initialization phase described, for example in FIG. 4. The initialization phase mentioned is preferably triggered when the supply voltages to the peripheral units connected are switched on, and hence also the timer 15 on each peripheral unit, which by counting, for example 4096 SCL cycles, determines how long the initialization phase mentioned should last. This time span is measured, especially as mentioned, for the safe quantity with which it should be detected whether two peripheral units 3 are connected to the common data line SD.

Thus, it can be seen that the first aspect of the invention, namely creating two-way communication, and the second aspect of the invention, namely identifying the configuration and resolving write-competency conflicts in the initialization phase, are independent of one another, but, as will be stated below, can preferably be combined, especially on a hearing aid with the digitally communicating system in the invention.

Figure 5:
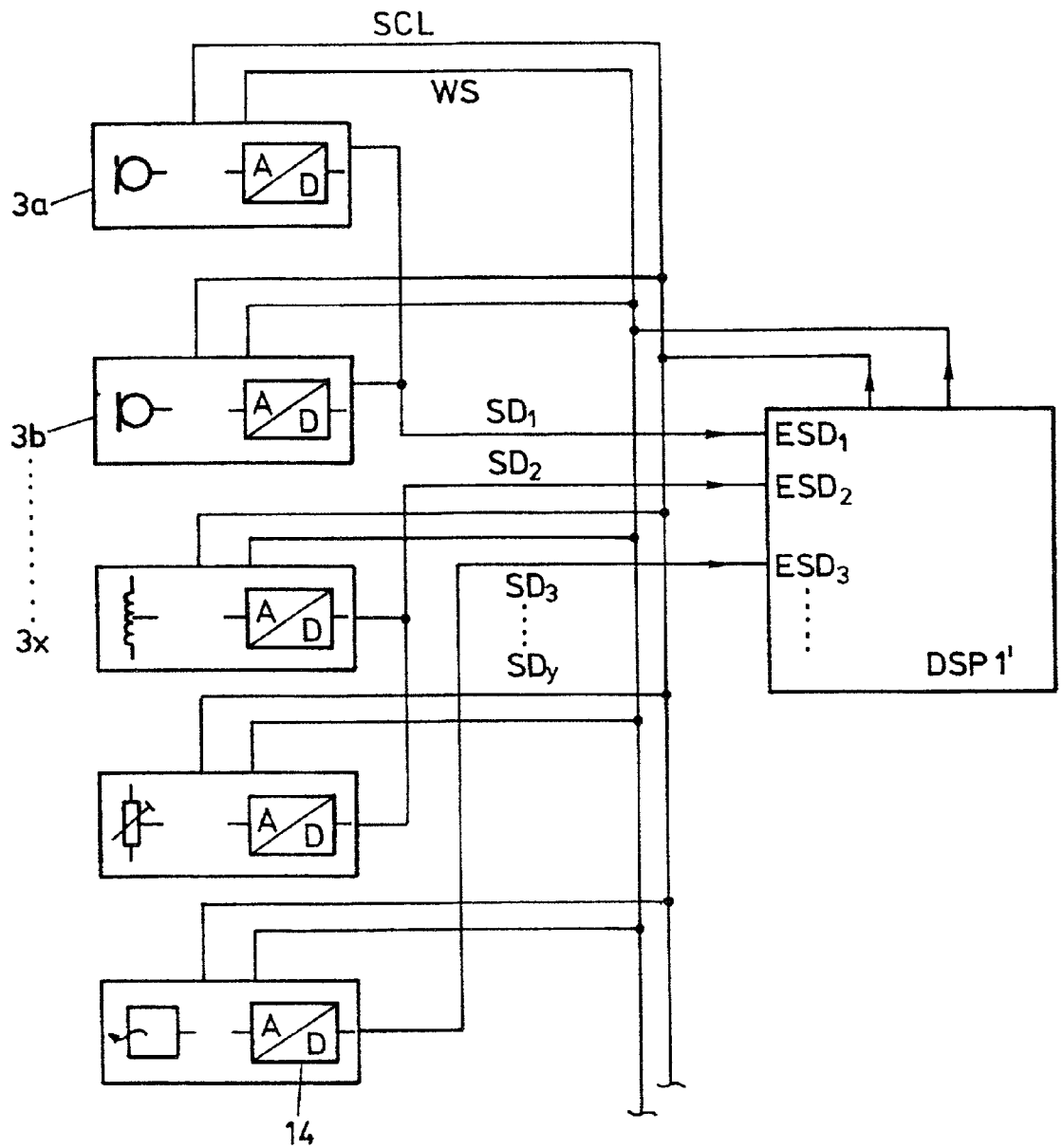
FIG. 5 is a view similar to FIG. 2 of the system in the invention with more than two second units that can be connected to a first unit.

FIG. 5 shows the system in the invention, which is based on the basic system in FIG. 2, but in which one and the same DSP1' can have any number of peripheral units 3a, 3b . . . 3x connected to it.

In FIG. 5, the peripheral units $3_x$, for example, on a hearing aid with the system in the invention, made up of microphones, T-coils, potentiometers, wireless communication sending/receiving units and interface conductors, for example, are all provided with an A/D converter 14, as shown. Each of these units works as already explained and is designed, for example, as was shown in FIG. 4. All peripheral units $3_x$ provided are connected to DSP1' via the common clock line SCL and the common permission line WS. One data line $SD_1$, $SD_2$, $SD_y$ is provided per pair of peripheral units $3_x$ and per pair started, according to FIG. 5, for the five peripheral units shown, for example, and hence their three, $SD_1$ to $SD_3$.

Such a system goes through the prescribed initialization phase for each pair of peripheral units $3_x$ provided and for each data line $SD_y$.

After the initialization procedure described above is over, there are no more write conflicts on the data lines, and one of the binary states of the permission signal $S_{WS}$ is assigned to the permission line WS of one of the peripheral units.

Especially with the configuration in FIG. 5, in which more than two peripheral units are connected to one DSP1', however, there is the problem that the data transmission in the invention from DSP1 to peripheral units $3_x$ should take place on the permission line WS in FIG. 2 or 3.

After the prescribed initialization phase is over, a "generate addresses" command is given by DSP1' over the common permission line WS, as shown in FIG. 3, which is interpreted the same on all peripheral units connected $3_x$. The conclusion of the initialization phase is controlled by the timer 15, which first activates the decoding unit 12, as in FIG. 6, for example.

Figure 6:
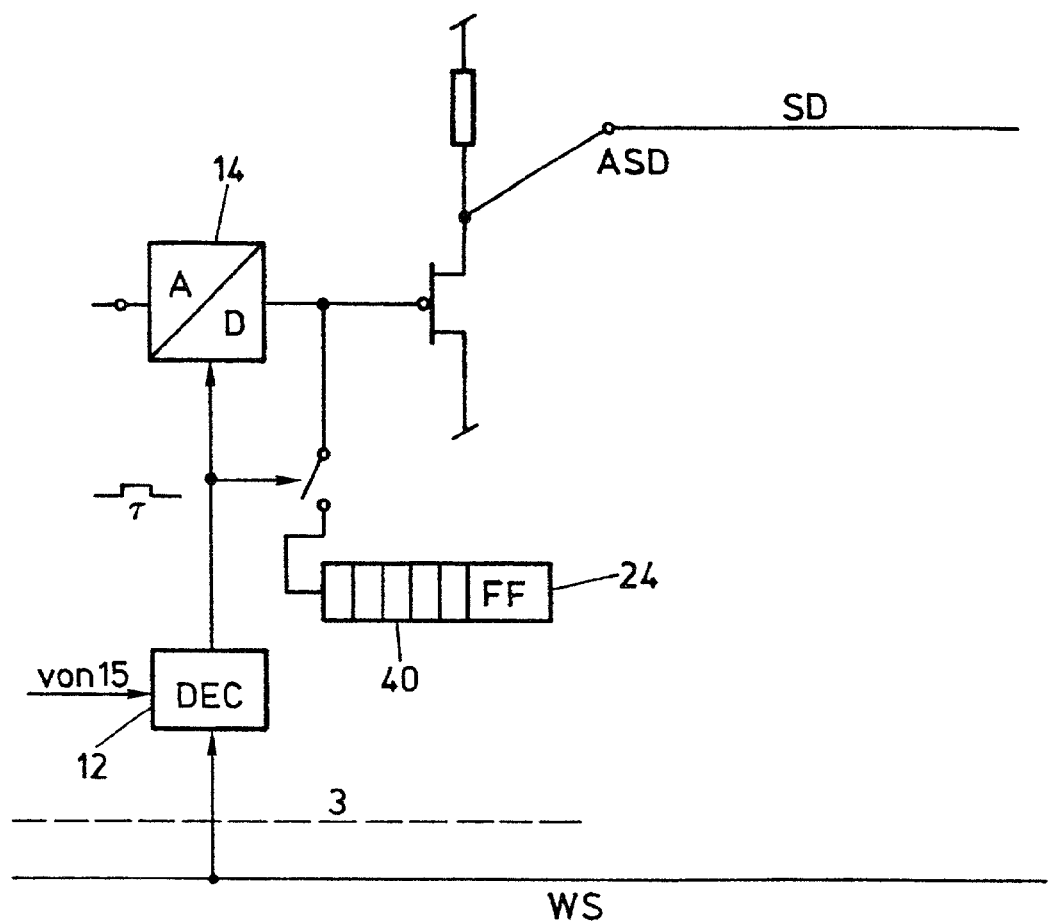
FIG. 6 is a simplified function/signal flow chart that shows some of the preferably used output phase of a second unit used in the invention to produce addresses randomly.

According to FIG. 6, the "generate addresses" command placed on permission line WS is decoded on the now free decoding units 12 of peripheral unit 3, everywhere so that the A/D converter 14 used as a random generator writes a random signal sequence on data line SD during a predetermined time t, on one hand, and at the same time files it in an address memory 409 as a random address, which forms an address with the permission findings in element 24, as in FIG. 4.

With a high degree of probability, based on the independence of the random generator on all peripheral units $3_x$, the random addresses filed in the respective address memories 40 and placed on the SD at the same time are not the same.

Of course, the respective peripheral units 32 write the random addresses in the write permission phases I and II in FIG. 3 of the permission signal on WS assigned to them in the initialization phase, which is not shown in FIG. 6.

Two peripheral units connected to one data line, for example $SD_1$, always have different addresses, since the specification of their write permission was determined in terms of cycles on line WS and is part of the address.

Thus, it is established from the start that clearly addressable peripheral units are connected per individual data line considered $SD_x$, since the permission phase determines the exclusive addresses with the storage state of element 24 in any case. But a case can occur where the address of a peripheral unit connected to a data line SD is the same as the address of a peripheral unit connected to another data line SD, hence units with the same write-permission phase. If this is determined on DSP1, another "generate addresses" command is triggered, specifically to the peripheral units found to be the same, by their common addressing. This goes on until all peripheral units connected have filed different addresses in memories 40, 24 and they are also posted in DSP1'.

Because of the independence of the random generators used, this procedure is also completed in a short time for several peripheral units.

Of course, it is also possible to provide addresses programmed practically into the hardware on at least some of the peripheral units provided beforehand, for example in the ROM.

The process and the communications system described provide a highly simple, versatile connection based on a three-line bus connection, which is especially suitable for use in hearing aids.

The invention claimed is:

1. A method of digital communicating via a three-wire link among
    a first unit having at least one serial data input and a write select command output;
    at least two second units, each having a serial data output and a write select command input;
    a one-wire serial data communication line interconnecting second unit serial data outputs and said serial data input;
    a one-wire write select command line interconnecting said write select command output and said second unit write select command inputs;
    a clock wire line interconnecting said first and said at least two second units;
comprising the steps of:
    establishing communication from said second units to said first unit by generating from said write select command output a write select command signal to said write select command inputs, thereby establishing which of said second units is allowed to write data on said serial data communication line;
    establishing communication from said first unit to said second units by encoding at said first unit upon said write select command signal on said write select command line further data, and decoding said further data from said write select command line at said second units.

2. The method of claim 1, wherein said aerial data communication line interconnects two of said at least two second units, both of said two second units being removable, further comprising detecting at at least one of said two second units whether the other of said second units is not removed.

3. The method of claim 2, said detecting comprising generating on each of said two second units which is not removed a random digital signal on said serial data communication line.

4. The method of claim 3, said random digital signal being generated by means of an analogue to digital converter.

5. The method of claim 3, said detecting further comprising comparing at each of said two second units not removed said random signal respectively generated with the random signal prevailing on said serial data communication line.

6. The method of claim 5, further comprising storing the occurrence of a predetermined comparison result at a respective one of said two second units.

7. The method of claim 5, further comprising assigning, as a function of a result of said comparing, time frames of said write select signal as write allowing cycles to one of said two second units and further time frames of said write select signal as write allowing cycles to the other of said two second units.

8. The method of claim 3, further comprising generating said random digital signal on said serial data communication line via a "wired AND" function.

9. The method of claim 5, further comprising at each of said two second units and during a predetermined amount of time monitoring whether a predetermined result of said comparing occurs or not, further monitoring at a respective one of said second units, whereat said predetermined result did not occur during said predetermined amount of time, whether there is a digital random signal on said serial data communication line when said respective one second unit is inhibited to write by said write select signal and defining said respective one of said, second units as the sole second unit not removed if said further monitoring reveals that no digital random signal is present.

10. The method of claim 9, further comprising applying a predetermined electric potential on said, serial data communication line by said sole second unit not removed as defined, during time spans when said sole second unit is inhibited to write by said write select signal.

11. The method of claim 2, further comprising initiating said detecting upon powering said first and second units.

12. The method of claim 1, further comprising providing more than two of said second units, providing for each pair and remaining single one of said second units one of said serial data communication lines and a respective further one of said serial data inputs at said first unit.

13. The method of claim 1, comprising generating at least at a part of said at least two second units addresses by means of random digital signals.

14. The method of claim 3, comprising generating at least at a part of said at least two second units addresses by means of said random digital signals.

15. The method of claim 14, further comprising collecting said addresses at said first unit and initiating by said first unit and via said write select line a further generating of addresses if at least two of said addresses coincide.

16. The method of claim 1, comprising said further data being communicated via said write select line only during predetermined cycle times of said write select signal.

17. The method of one of claims 1 to 14, wherein said first unit is a digital signal processing unit of a hearing device, said second units being units of said hearing device.

18. The method of claim 17, said second units being selected from the group of acoustical/electrical converters, electric actuators, T-coils, interface units, adjusting members, thereby potentiometers, switches.

19. The method of claim 18, said second units acting via an analogue to digital conversion on said serial data communication line.

20. The method of claim 19, said conversion being performed in said second units.

21. A system for digital communication, comprising:
    a digital processing unit having at least one input for serial digital data and an output for a write select signal;
    at least two removable further units, each with an output for serial digital data and an input for a write select signal;
    removable further unit outputs being connected by a first single-wire line to said input of said digital processing unit;
    said output of said digital processing unit being connected to said removable further unit inputs by a second single-wire line;
    said digital processing unit and said further units being interconnected by a third single wire line for a clock signal; said digital processing unit having an encoder operationally connected to said output for said write select signal to encode upon a second line further signals;
    said two removable further units having each a decoder operationally connected to said removable further unit inputs for said write select signal to decode said further signals.

22. The system of claim 21, a random digital signal generator being provided at each of said two further units, having an output operationally connected to said first single-wire line.

23. The system of claim 22, said output of said random digital signal generator and said first single-wire line being operationally connected to inputs of a comparator unit at said further units.

24. The system of claim 23, said generator comprising a analogue to digital converter.

25. The system of claim 23, said digital processing unit generating at said output for said write select signal signal cycles with a selecting function for one of said further units to write and to be inhibited, the other to write and further cycles with an inverse function, an output of said comparator unit controlling cycle to function assignment.

26. The system of claim 23, wherein said random digital signal generator is operationally connected to said first single-wire line via a "wired AND" function.

27. The system of claim 21, said further units having a controllable switching arrangement being operationally connected with said output for serial digital data and having a control input operationally connected to said input for said write select signal, thereby controllably switching said output for serial digital data on a defined electrical potential.

28. The system of claim 22, said random digital signal generator being started by applying power to the respective further unit.

29. The system of claim 21, wherein more than two further units are provided and each pair or single further unit is linked to said digital processing unit via one of said first single-wire lines.

30. The system of claim 21, wherein each of said further units has a controllable random digital signal generator, the output thereof being operationally connectable to said output for serial digital data controlled by a predetermined signal applied to said second single-wire line, whereby a sequence of said random digital signals is stored in a storage in said digital processing unit as well as in respective further storages in said further units.

31. The system of claim 30, wherein said sequence and a signal cycle value of said write select signal which selects a respective further unit to write is stored at said respective further unit in an address storage unit as well as in a further storage in said digital processing unit, the addresses stored in said digital processing unit being led to a comparator unit, the output of which initiating via said second single-wire line generating a further sequence to be generated.

32. The system of claim 21, wherein said encoder at said digital processing unit is operationally connected to a time control unit which controls generating of said further signal upon said second line only in predetermined time spans of a cycle of said write select signal.

33. The system of claim 21, wherein said digital processing unit is a digital processing unit of a hearing device, said further units being units of said hearing device.

34. The system of claim 33, wherein said further units are selected from the group including acoustical/electrical converters, electrical actuators, T-coils, interface units, adjusting members, thereby potentiometers or switching units.

* * * * *